United States Patent
Yamanaka et al.

(10) Patent No.: US 9,384,124 B2
(45) Date of Patent: Jul. 5, 2016

(54) DATA STORAGE DEVICE, MEMORY CONTROL METHOD, AND ELECTRONIC DEVICE WITH DATA STORAGE DEVICE

(71) Applicants: Taichiro Yamanaka, Hino (JP); Yoko Masuo, Iruma (JP); Hironobu Miyamoto, Yokohama (JP)

(72) Inventors: Taichiro Yamanaka, Hino (JP); Yoko Masuo, Iruma (JP); Hironobu Miyamoto, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 262 days.

(21) Appl. No.: 13/720,356

(22) Filed: Dec. 19, 2012

(65) Prior Publication Data
US 2014/0025863 A1 Jan. 23, 2014

Related U.S. Application Data

(60) Provisional application No. 61/673,909, filed on Jul. 20, 2012.

(51) Int. Cl.
*G06F 12/02* (2006.01)

(52) U.S. Cl.
CPC .... *G06F 12/0246* (2013.01); *G06F 2212/7205* (2013.01)

(58) Field of Classification Search
None
See application file for complete search history.

(56) References Cited

U.S. PATENT DOCUMENTS

| 8,677,203 | B1* | 3/2014 | Shalvi | G06F 11/14 |
| | | | | 714/723 |
| 2012/0054418 | A1* | 3/2012 | Masuo et al. | 711/103 |
| 2012/0124330 | A1 | 5/2012 | Yano et al. | |
| 2012/0317392 | A1* | 12/2012 | Driever et al. | 711/200 |
| 2014/0019672 | A1 | 1/2014 | Harasawa et al. | |

FOREIGN PATENT DOCUMENTS

JP 2009-211232 A 9/2009

* cited by examiner

*Primary Examiner* — Brian Peugh
*Assistant Examiner* — Tracy Chan
(74) *Attorney, Agent, or Firm* — Oblon, McClelland, Maier & Neustadt, L.L.P (57) ABSTRACT

According to one embodiment, a data storage device includes a first controller, a second controller, and a third controller. The first controller performs a control operation of writing data of a first data unit to a storage area in a flash memory and reading the data of the first data unit from the storage area. The second controller carries out migration processing of measuring a data amount of valid data stored in storage areas of a second data unit that is a data erase processing unit.

10 Claims, 7 Drawing Sheets

| Block ID | Block status |
|---|---|
| 0 | Active |
| 1 | Active |
| 2 | S-Active |
| 3 | Free |
| 4 | Free |
| ⋮ | ⋮ |

DATA STORAGE DEVICE, MEMORY CONTROL METHOD, AND ELECTRONIC DEVICE WITH DATA STORAGE DEVICE

CROSS-REFERENCE TO RELATED APPLICATIONS

This application claims the benefit of U.S. Provisional Application No. 61/673,909, filed Jul. 20, 2012, the entire contents of which are incorporated herein by reference.

FIELD

Embodiments described herein relate generally to a data storage device using a nonvolatile memory, a memory control method, and an electronic device with the data storage device.

BACKGROUND

In recent years, great effort has been made to develop solid-state drives (SSDs) using, as a data storage device, a NAND flash memory (hereinafter sometimes simply referred to as a flash memory) that is a rewritable nonvolatile (or non-transitory) memory. In the SSD, as data in the flash memory is repeatedly rewritten, the ratio of storage areas in each block in which valid data (latest data) cannot be stored increases due to the presence of invalid data (data that is not latest). Thus, the SSD executes compaction processing of releasing blocks with reduced valid data to provide unwritten blocks. Garbage collection processing is different from the compaction processing in spite of the same purpose to release or clear up memory areas. The compaction processing is carried out in units of blocks.

Such compaction processing involves a method in which if for example, an error occurs in read processing for checking a block for valid data, the block is determined to be a bad block. However, such a method increases the number of unavailable blocks, possibly preventing the effective use of storage areas.

DETAILED DESCRIPTION

Various embodiments will be described below with reference to the drawings.

In general, according to one embodiment, a data storage device comprises a first controller, a second controller, and a third controller. The first controller performs a control operation of writing data of a first data unit to a storage area in a flash memory and reading the data of the first data unit from the storage area. The second controller carries out migration processing of measuring a data amount of valid data stored in storage areas of a second data unit that is a data erase processing unit, the valid data being latest data, selecting a low-density storage area with a small data amount as a first target area, allowing the first controller to read the valid data from the first target area, and allowing the first controller to write the read valid data to a second target area included in the storage areas of the second data unit and from which all data has been erased, to migrate the valid data from the first target area to the second target area. The third controller cancels a status of the first target area indicating that the first target area is a selection candidate and changes a status of the first target area to a special status of storage area in which the first target area holds valid data until the first target area is determined to be an erase target area, if the third controller detects when the migration processing of the second controller has failed to terminate normally.

Configuration of a Data Storage Device

Figure 1:
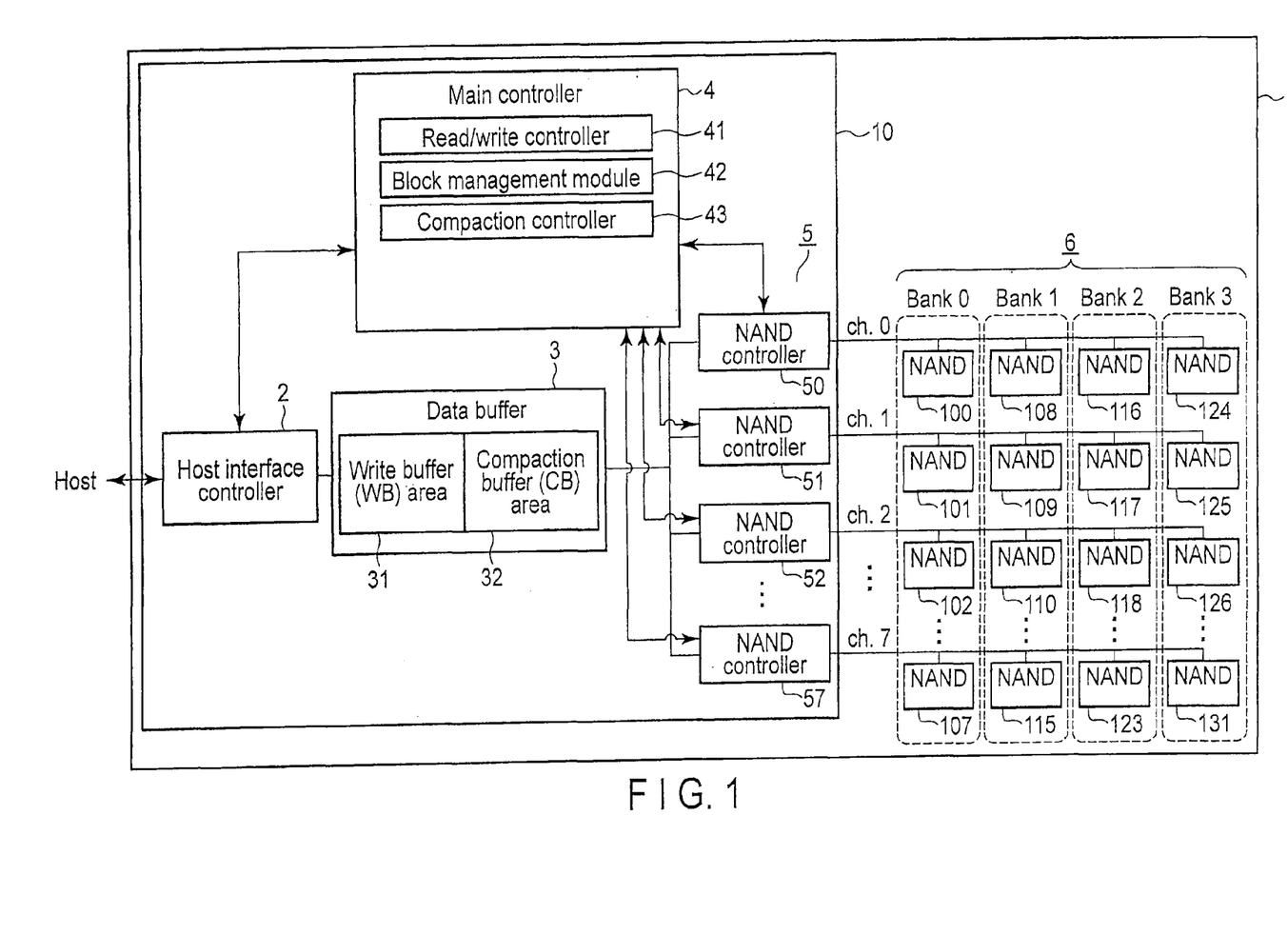
FIG. 1 is a block diagram illustrating a configuration of an SSD according to an embodiment.

As shown in FIG. 1, a data storage device according to an embodiment is a solid-state drive (SSD) 1 comprising, as a data storage medium, a NAND flash memory (hereinafter referred to as a flash memory) 6 that is a nonvolatile memory. The flash memory 6 comprises a plurality of memory chips 100 to 131 groups in a matrix configuration with channels ch0 to ch7 corresponding to rows and banks 0 to 3 corresponding to columns. Each of the memory chips 100 to 131 comprises a plurality of physical blocks.

Moreover, the SSD 1 includes an SSD controller 10 that controls the flash memory 6. The SSD controller 10 comprises a host interface controller 2, a data buffer 3, a main controller 4, and a memory controller 5.

The host interface controller 2 controls transfer of data, commands, and addresses between a host and the SSD 1. Here, the host is a computer or the like which includes an interface conformant with the Serial AT (SATA) standard. The host interface controller 2 stores data transferred by the host (write data) in the data buffer 3. Furthermore, the host interface controller 2 transfers commands and addresses transferred by the host to the main controller 4.

The data buffer 3 is, for example, a buffer memory comprising a dynamic random access memory (DRAM). The data buffer 3 need not necessarily be a DRAM but may adopt any other type of volatile random access memory such as a static random access memory (SRAM). Alternatively, the data buffer 3 may adopt a nonvolatile random access memory such as a magnetoresistive random access memory (MRAM) or a ferroelectric random access memory (FeRAM).

The data buffer 3 comprises a write buffer area (WB area) 31 and a compaction buffer area (CB area) 32. The WB area 31 stores write data (user data) transferred by the host. The CB area 32 stores write data (valid data) during compaction processing. The data buffer 3 may include an area in which a conversion table for conversion between logical addresses and physical addresses is stored.

The main controller 4 comprises, for example, a microprocessor (MPU) and performs a main control operation on the SSD controller 10. The main controller 4 includes a read/ write controller 41, a block management module 42, and a compaction controller 43, and integrally controls NAND controllers 50 to 57.

The read/write controller 41 controls read processing and write processing in accordance with a read command and a write command transferred by the host via the host interface controller 2. Furthermore, the read/write controller 41 controls migration processing (or refresh processing) for compaction processing on the flash memory 6 in accordance with a write command for the compaction processing from the compaction controller 43.

The memory controller 5 comprises the plurality of NAND controllers 50 to 57 for the respective channels ch0 to ch7. The memory controller 5 carries out read processing and write processing on the flash memory in accordance with commands from the read/write controller 41. Each of the NAND controllers 50 to 57 performs a parallel operation of carrying out read processing or write processing, in parallel, on those of the memory chips 100 to 131 which are located on a corresponding one of the channels ch0 to ch7, and a bank interleave operation using the four banks. The memory controller 5 carries out read processing or write processing for compaction processing on the flash memory in accordance with a command from the read/write controller 41, which cooperates with the compaction controller 43.

Now, the definitions of terms used in the present embodiment will be described.

A sector is a minimum unit for access by the host. One sector is, for example, 512 bytes. A cluster is a data management unit in the SSI 1. For example, one cluster comprises eight sectors. Valid clusters hold the latest data. In valid clusters hold data that is not latest.

The compaction processing is migration processing of retrieving a valid cluster from a logical block that is a compaction source block (compaction target block) and migrating the valid cluster to a new logical block (compaction destination block). The migration processing is also referred to as refresh processing. The compression processing allows a logical block to be released and changed to an unwritten, free block. Besides the compaction processing, garbage collection processing is well-known which is intended to release memory areas.

A page is a unit of data to be written to the flash memory 6. For example, one page is 8 KB (=8192 bytes). A physical block is a unit of data erase. For example, one physical block comprises 64 pages. A logical block comprises a plurality of physical blocks. According to the present embodiment, the logical block is sometimes simply referred to as a block.

One logical block comprises, for example, "8 Channels×4 banks×2 planes", that is, 64 physical blocks. The plane (PL) is a area that allows for simultaneous accesses within the same memory chip. According to the present embodiment, for example, one plane corresponds to two clusters (one logical page). The channel is a transmission path through which data are transmitted via the NAND controller. The present embodiment comprises eight channels capable of transmitting up to eight data in parallel (concurrently). The bank is an aggregation unit of memory chips managed by the NAND controller for each channel.

A logical block address (LBA) corresponds to a sector number specified by the host via a command and which is unique within the SSD 1. A logical cluster address (LCA) is a cluster number that is unique within the SSD 1. According to the present embodiment, since one cluster comprises eight sectors, the LCA is expressed by a value obtained by shifting the LBA rightward by three bits. A media block address (MBA) is a block number (block ID) added to a logical block and that is unique within the SSD 1.

Figure 5:
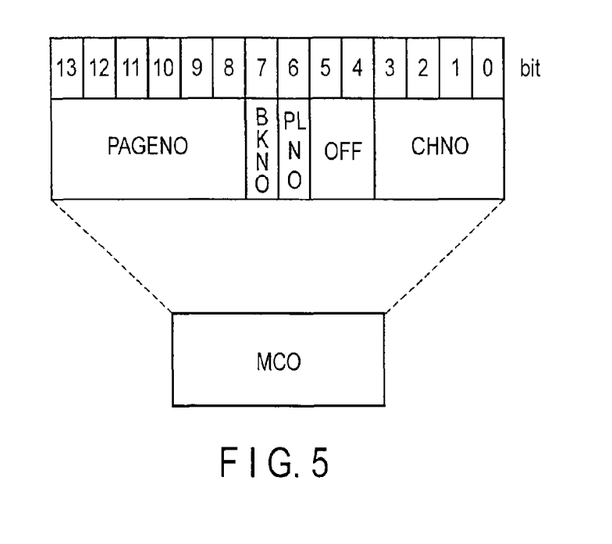
FIG. 5 is a diagram illustrating a configuration of MCO information according to the embodiment.

A media cluster offset (MCO) is a number added to a cluster and that is unique within a logical block. According to the present embodiment, as shown in FIG. 5, the MCO comprises a page number in a logical block PAGENO, a bank number in a logical page BKNO, a plane number in a bank PLNO, an offset in a plane OFF, and a channel number CHNO.

Figure 2:
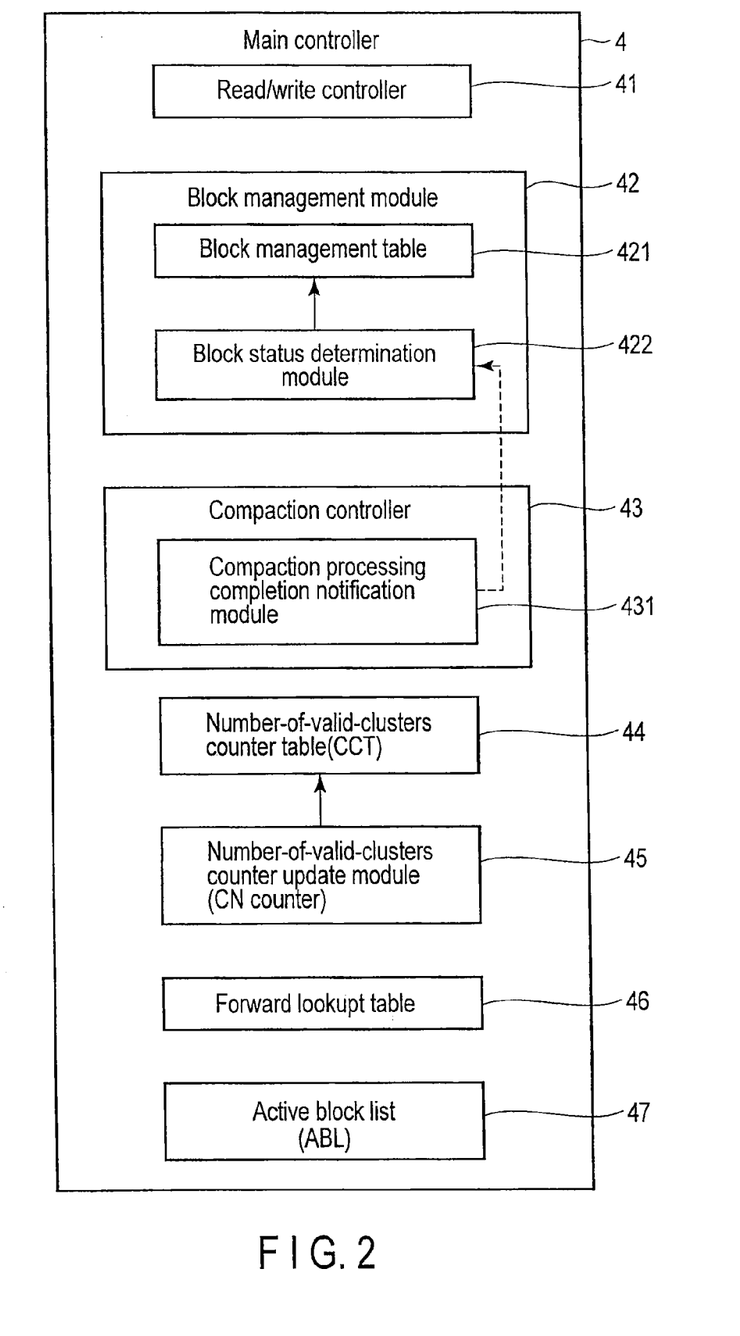
FIG. 2 is a block diagram illustrating a configuration of a main controller according to the embodiment.

FIG. 2 is a block diagram showing an essential part of the main controller 4 according to the present embodiment. The main controller 4 implements such functions as described below using MPUs and software.

Figure 7:
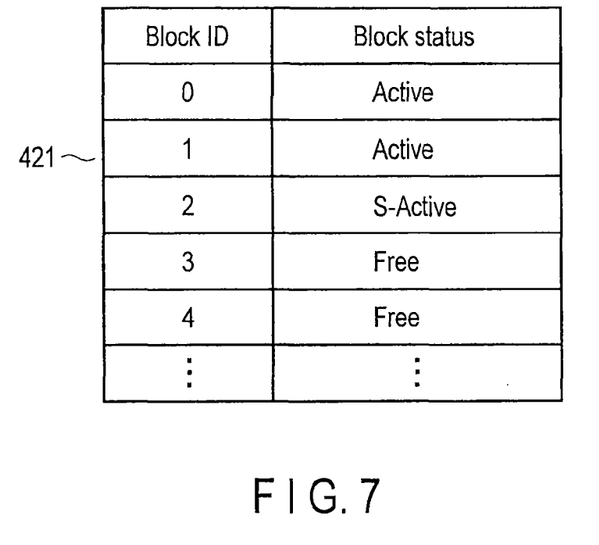
FIG. 7 is a diagram illustrating a configuration of a block management table according to the embodiment.

As shown in FIG. 2, in the main controller 4, the block management module 42 uses a block management table 421 to manage the status of each block and write completion pages. As shown in FIG. 7, the block management table 421 comprises management information such as a block ID (block number) that identifies each block and the status of each block. The status of the block is one of a write completion (Active) status, an unwritten (Free) status, and special active (S-Active) status. That is, an active block is a logical block with a valid cluster. A free block is an erasable logical block with no valid cluster. Furthermore, a bad block is a faulty disabled logical block.

The block management module 42 includes a block status determination module 422. The block status determination module 422 determines the status of the compaction source block when compaction processing described below terminates. The block status determination module 422 then sets the status (Active, Free, or S-Active) in the block status management table 421.

The compaction controller 43 controls the compaction processing. The compaction controller 43 transfers a read command allowing read processing for the compaction processing to be carried out and a write command allowing write processing for the compaction processing to be carried out, to the read/write controller 41. The compaction controller 43 includes a compaction processing completion notification module 431. The compaction processing completion notification module 431 notifies the block status determination module 422 that compaction processing of one logical block has been completed.

Moreover, the main controller 4 comprises a number-of-valid-clusters counter table (CCT) 44, a number-of-valid-clusters counter update module (CN counter) 45, a forward lookup table 46, and an active block list (ABL) 47. Here, the block management table 421, the CCT 44, the forward lookup table 46, and the ABL 47 are stored in a memory (DRAM) controlled by the main controller 4.

The CCT 44 is a search table comprising count values each for the number of valid clusters in the corresponding logical block which values are arranged using block IDs as indices. The count value is data indicative of the number of valid clusters (for example, valid data for eight sectors) recorded in each logical block. The number of valid clusters is used to select a compaction target (compaction source block) for the compaction processing described below.

The CN counter 45 updates the count value of the number of valid clusters in the CCT 44. Specifically, when an LBA is updated, the CN counter 45 performs a control operation of subtracting one from the non-updated count value of the number of valid clusters in the corresponding logical block and adding one to the updated count value of the number of valid clusters in the corresponding logical block.

The forward lookup table 46 manages places in the flash memory 6 in which data is recorded in units of clusters.

Specifically, the forward lookup table 46 is implemented as an array of elements that are entry data comprising MBAs and MCOs. The ABL 47 is a list in which active (Active) blocks and special active (S-Active) blocks stored in the block management table 421 are registered according to the block ID.

The main controller 4 also comprises a logical/physical conversion table. The logical/physical conversion table is indicative of the associations between the logical blocks and the physical blocks. According to the present embodiment, the logical/physical conversion table is defined as a table allowing the physical cluster position of a corresponding physical block to be determined based on the MBA and the MCO.

Figure 3:
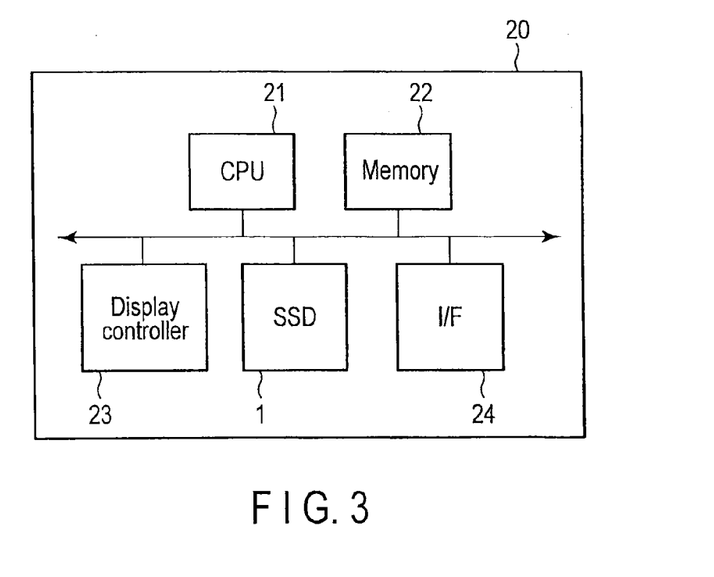
FIG. 3 is a block diagram illustrating a configuration of an electronic device according to the embodiment.

FIG. 3 is a block showing an essential part of an electronic device 20 comprising the SSD 1 according to the present embodiment.

As shown in FIG. 3, the electronic device 20 is, for example, a personal computer comprising a CPU 21, a memory 22, a display controller 23, and an interface (I/F) 24. The electronic device 20 uses the SSD 1 according to the present embodiment as a storage device such as a file retention device. The SSD 1 carries out read processing and write processing on the flash memory 6 as described above. Alternatively, the SSD 1 may be configured to carry out the compaction processing according to the present embodiment in accordance with a command from the CPU 21, which serves as a host.

Compaction Processing

Now, the compaction processing according to the present embodiment will be described in brief with reference to FIG. 4.

Figure 4:
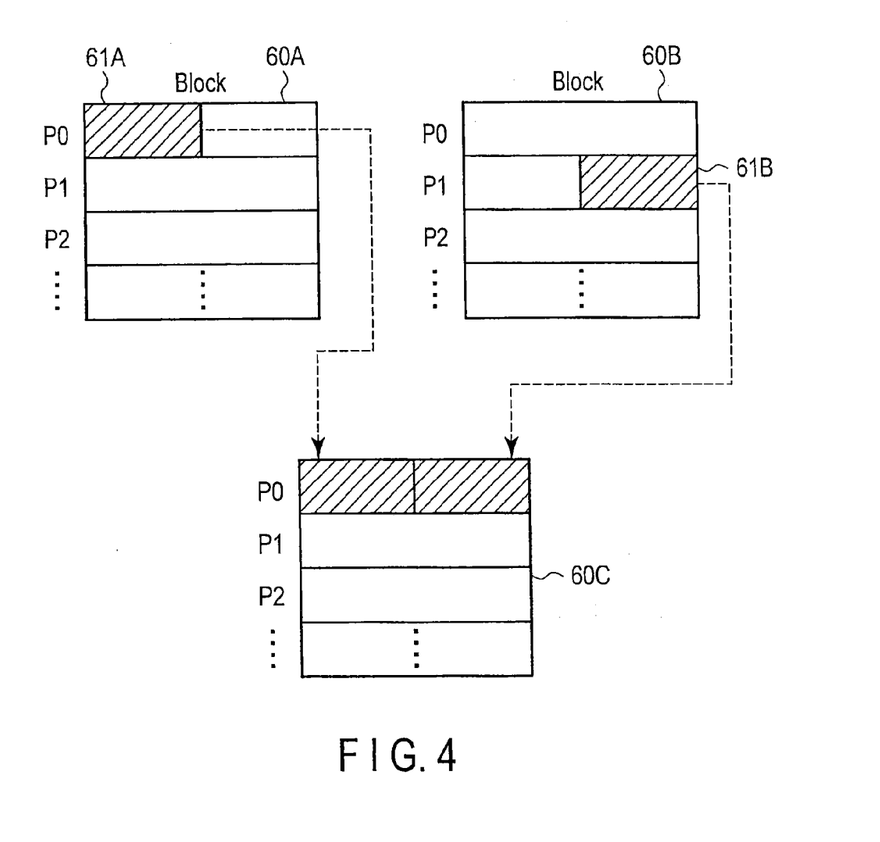
FIG. 4 is a diagram for explaining compaction processing according to the embodiment.

As shown in FIG. 4, the compaction controller 43 searches the flash memory 6 for compaction source blocks 60A and 60B (the two logical blocks are discussed for convenience). The compaction source blocks are included in the active blocks with valid data recorded therein and are to be subjected to the compression processing because storage areas with valid date (latest data) have reduced densities. The compaction controller 43 acquires information required to set candidates for the compaction source blocks, from the block management module 42. In this case, for efficient compaction processing, the compaction source blocks to be searched for are desirably low-density blocks with as few valid clusters as possible.

Here, each of the blocks 60A and 603 comprises a plurality of logical pages (P0 to P2). Each of the logical pages comprises a plurality of clusters (two clusters). Valid clusters are valid data in units of clusters. The compaction controller 43 acquires valid clusters 61A and 61B in the searched-for compaction source blocks 60A and 60B from the block management module 42. Log information required to allow determination of whether the cluster is valid or invalid (invalid data) is normally stored in each block.

Figure 6:
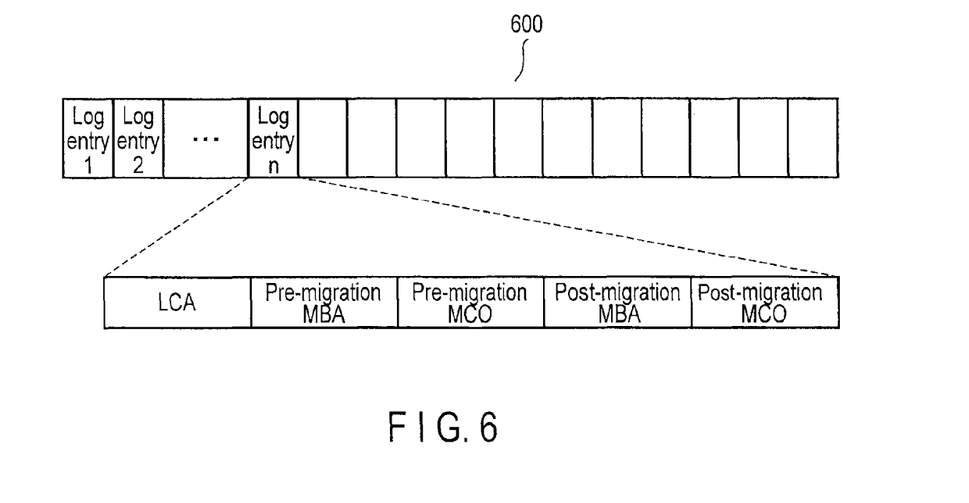
FIG. 6 is a diagram illustrating a configuration of a cluster according to the embodiment.

As shown in FIG. 6, a LOG cluster 600 corresponding to one cluster is assigned to one block as a storage area in which log information is stored. The LOG cluster 600 comprises log information (log entry-1 to log entry-n) corresponding to each of the clusters included in the block. The log information (log entry-n) indicates logical positions among which the LCA of each cluster has migrated, in a time-series manner (the log information include pre-migration MBA and MCO and post-migration MBA and MCO). The compaction controller 43 reads the LOG cluster 600 to determine whether the clusters included in each block are valid or invalid. That is, the compaction controller 43 determines clusters with the latest data to be valid based on the log information in the LOG cluster 600.

The compaction controller 43 outputs a compaction command allowing the compaction processing to be carried out to the read/write controller 41. The read/write controller 41 cooperates with the compaction controller 43 in carrying out the compaction processing. That is, the memory controller 5 executes read processing of reading the valid clusters 61A and 61B from the compaction source blocks 60A and 60B, respectively, in accordance with a command from the read/write controller 41. Moreover, the memory controller 5 executes write processing of writing the valid clusters 61A and 61B read from the compaction source blocks 60A and 60B, to a compaction destination block 60C. The compaction destination block 60C is a free block selected from the list in the block management table managed by the block management module 42.

Such compaction processing as described above collects the valid clusters (valid data in units of clusters) 61A and 61B from the compaction source blocks 60A and 60B and migrates the valid clusters 61A and 61B to the compaction destination block 60C. After the migration processing, the compaction source blocks 60A and 60B can be reutilized as free blocks via erase processing.

Operation of the Embodiment

Figure 9:
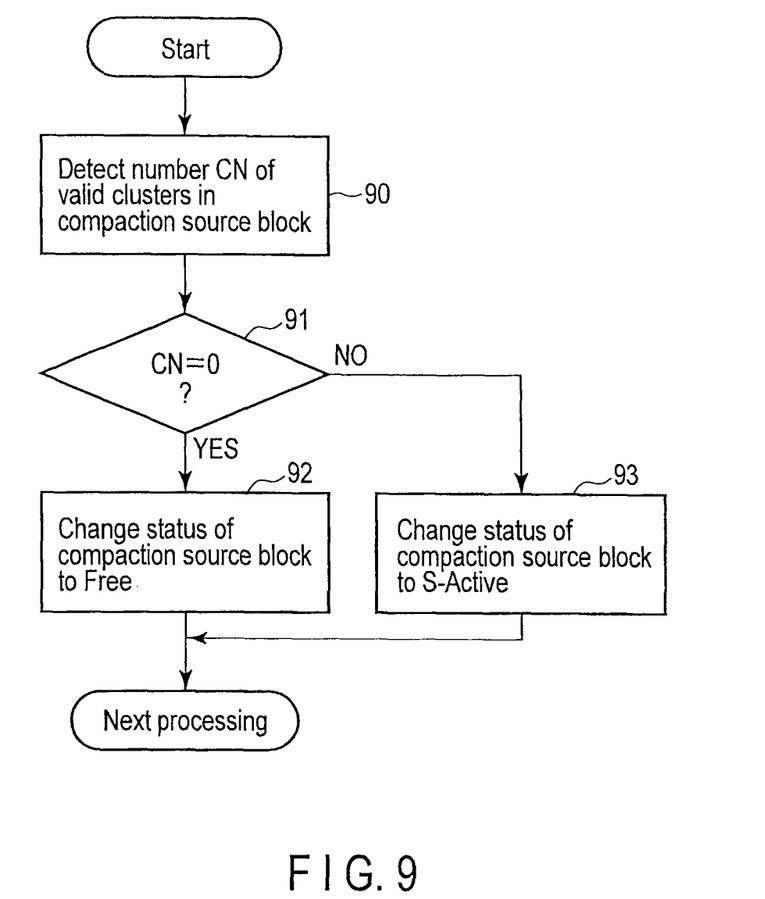
FIG. 9 is a flowchart for explaining processing of changing the status of blocks during the compaction processing according to the embodiment.
Figure 10:
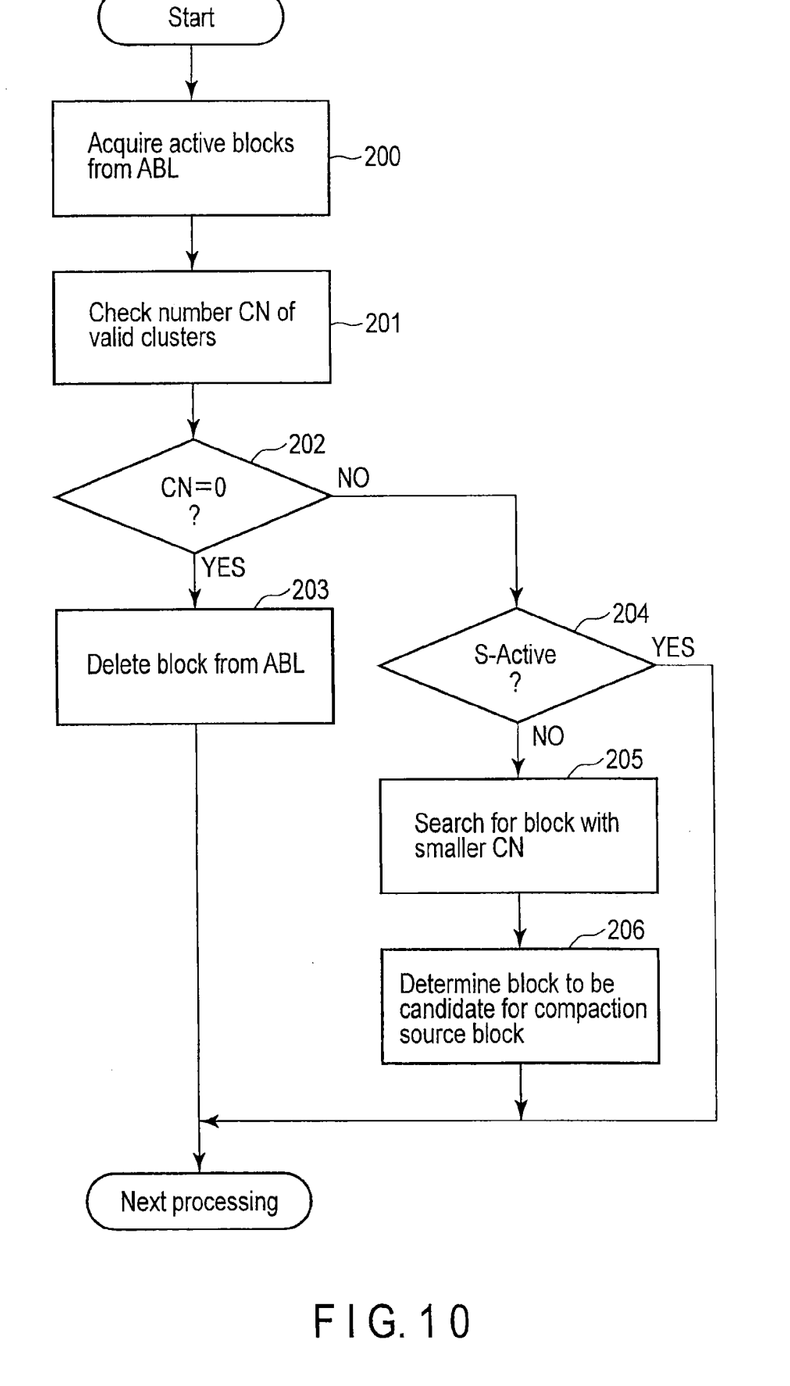
FIG. 10 is a flowchart for explaining processing of determining a compaction source block.

Operation of the present embodiment will be described below with main reference to flowcharts in FIGS. 9 and 10.

First, with reference to the flowchart in FIG. 9, processing carried out by the block status determination module 422 will be described. The block status determination module 422 starts processing upon receiving a notification indicating that compaction processing of one block (logical block) has been completed, from a compaction processing completion notification module 431 of the compaction controller 43. That is, the block status determination module 422 acquires the number CN of valid clusters in the compaction source block from the CCT 44 (block 90).

If the number CN of valid clusters is zero, the block status determination module 422 changes the status of the compaction source block to Free status (YES in block 91, 92). That is, the block status determination module 422 sets the Free status at the corresponding block ID in the block management table 421. Furthermore, the block status determination module 422 deletes the entry corresponding to this active block from the ABL 47.

Figure 8:
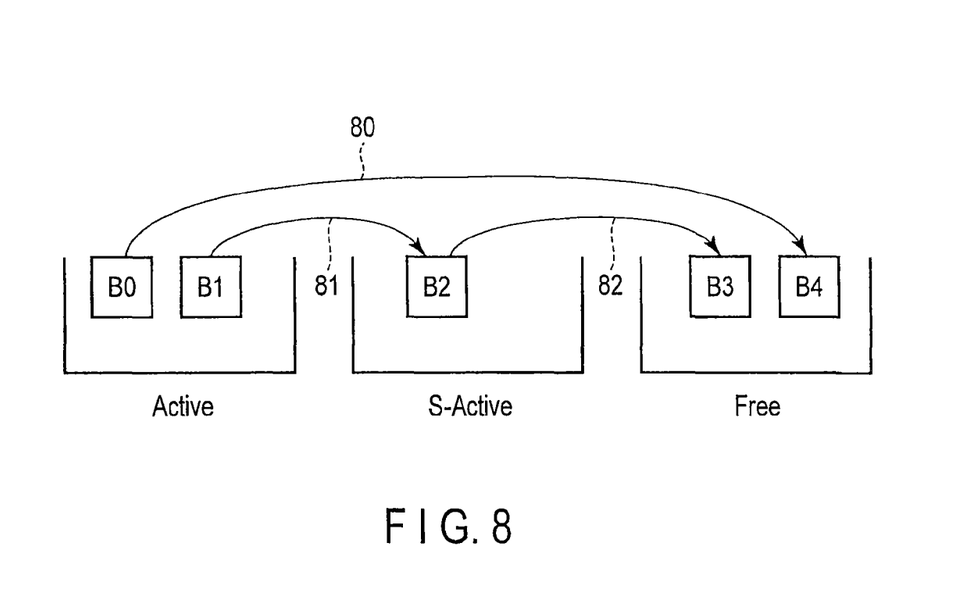
FIG. 8 is a diagram for explaining the status of blocks during the compaction processing according to the embodiment.

Such processing changes an Active block (B0, ID=0) into a Free block (B4, ID=4) as shown at reference numeral 80 in FIG. 8. The block (B4) is a newly rewritable free block obtained by deleting all the data in the invalid clusters in the block.

On the other hand, if the number CN of valid clusters is not zero, the block status determination module 422 changes the status of the compaction source block to S-active status (NO in block 91, 93). That is, the block status determination module 422 sets the S-Active status at the corresponding block ID in the block management table 421. Furthermore, the block status determination module 422 maintains the entry in the ABL 46 which corresponds to this active block.

That is, the S-Active block has a special status in which the block is excluded from candidates for the compaction source block that is the target of the compaction processing and holds valid clusters until the block is made free by deleting all the data from the block. In accordance with a rewrite request from the host, a specified valid cluster is read from the S-Active block. Thus, like normal Active blocks, the S-Active block will eventually contain only invalid clusters. A block only with invalid clusters is changed to a newly rewritable free block by deleting all the data from the block.

Such processing changes an Active block (B1, ID=1) into an S-Active block (B2, ID=2) as shown at reference numeral 81 in FIG. 8. The block (B2) is excluded from the candidates for the compaction source block. As shown at reference numeral 82 in FIG. 8, the block (B2) can be changed into a Free block (B3, ID=3) when the number CN of valid clusters becomes zero.

Here, if the compaction processing terminates normally, the data in all the valid clusters in the compaction source block have been migrated to another block (free block). Thus, the number CN of valid clusters is zero. If the number CN of valid clusters is not zero, the compaction processing has failed to terminate normally. The compaction controller 43 reads the log information from the log cluster in order to determine valid clusters in the compaction source blocks. At this time, if a read error occurs, the compaction controller 43 suspends the compaction processing. This prevents the compaction processing from terminating normally.

The block status determination module 422 may start the above-described series of processes in response to a notification from the compaction controller 43 indicating that an error has occurred in the reading of the log information instead of the notification from the compaction processing completion notification module 431.

Now, with reference to the flowchart in FIG. 10, the processing of determining the compaction source blocks by the compaction controller 43 will be described.

The compaction controller 43 sequentially acquires active blocks from the ABL 46 starting with the leading block (block 200). The compaction controller 43 references the CCT 44 to check the number CN of valid clusters in each active block (block 201). As described above, the compaction controller 43 determines valid clusters based on the log information read from the log cluster for each block.

If the number CN of valid clusters is zero, the compaction controller 43 deletes the entry corresponding to the block from the ABL 47 because the block is free block (YES in block 202, 203).

On the other hand, if the number CN of valid clusters is not zero, the compaction controller 43 references the entry corresponding to the block in the block management table 421 to determine whether or not the block has the S-Active status (block 204). If the block has the S-Active status, the compaction controller 43 excludes the block from the candidates for the compaction source block (YES in block 204).

If the block does not have the S-Active status, the compaction controller 43 selects the block as a candidate for the compaction source block (NO in block 204). The compaction controller 43 searches one of the blocks which has the smallest number of valid clusters (block 205). Specifically, if the number of valid clusters in the current compaction processing target block is smaller than the number of valid clusters in a block selected before the processing of the current block, the current block is selected. Otherwise, the preceding selection is maintained. Thus, the compaction controller 43 determines the block with the smallest number of valid clusters to be a candidate for the compaction source block (block 206).

If the block with the smallest number of valid clusters is selected from all the active blocks as the compaction source block, the number of blocks selected during a single processing operation may be N (N is an integer greater than or equal to zero). For N=0, the compaction processing may be considered to make the number of valid clusters stored in the CCT 44 consistent with the actual number of valid clusters in the block.

The compaction controller 43 migrates the data in all the valid clusters in the block determined to be a candidate for the compaction source block to another block (free block) to make the candidate block free. The candidate block is changed to a newly rewritable free block by deleting all the data from the invalid clusters in the block.

As described above, the present embodiment registers, as S-active blocks, active blocks on which the compaction processing fails to complete normally based on an error in reading of the log information required to determine valid clusters. The S-Active active blocks are excluded from the candidates for the compaction source block and left uncontrolled.

That is, the S-Active blocks are kept registered in the ABL 47. Thus, the compaction controller 43 searches the ABL 47 for S-Active blocks and continues processing of checking the number CN of valid clusters (see blocks 200 and 201). For the S-Active blocks, valid clusters are migrated to another block (free block) in accordance with a rewrite request from the host. This reduces the number of valid clusters in each S-Active block. When the number of valid clusters becomes zero, the S-Active block is changed into a Free block (see reference numeral 82 in FIG. 8).

The present embodiment can thus avoid determining active blocks on which the compaction processing fails to terminate normally to be faulty bad blocks. As a result, the storage areas in the SSD can be effectively utilized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage device comprising:
    a flash memory; and
    a controller configured to perform migration processing for writing valid data stored in a first storage block to a second storage block, when the first storage block is set as a compaction source block, wherein the first storage block is set to an active block status and the second storage block is set to a free block status, and the valid data is latest data before rewriting,
    wherein the controller is configured to:
        suspend the migration processing if an error in data read process from the first storage block occurs under execution of the migration processing;
        change the first storage block to a special active block status from the active block status, the first storage block of the special active block status holding the valid data and being excluded from selection as the compaction source block; and
        change the first storage block to the free block status from the special active block status, when all of the valid data is read from the first storage block of the special active block status, in accordance with rewrite requests.

2. The data storage device of claim 1, wherein the controller is further configured to determine that the error in the data read process from the first storage block occurs and to change the first storage block to the special active block status from the active block status when the valid data remains in the first storage block after suspension of the migration processing.

3. The data storage device of claim 1, wherein the controller is further configured to set information indicative of the special active block status as management information used to manage a data write status for each storage block, and
the controller is configured to exclude the first storage block of the special active block status as a selection candidate for migration processing if the first storage block is selected with reference to the management information.

4. The data storage device of claim 1, wherein the controller is further configured to maintain the first storage block of the special active block status until all valid data in the first storage block are rewritten by data rewrite processing.

5. The data storage device of claim 1, wherein the controller is further configured to determine whether or not the valid data remains in the first storage block, and to set the first storage block to the free block status block when no valid data remains.

6. An electronic device with a data storage device that writes and reads data managed in units of blocks to and from a flash memory, the electronic device comprising:
the flash memory; and
a controller configured to perform migration processing for writing valid data stored in a first storage block to a second storage block, when the first storage block is set as a compaction source block, wherein the first storage block is set to an active block status and the second storage block is set to a free block status, and the valid data is latest data before rewriting,
wherein the controller is configured to:
suspend the migration processing if an error in data read process from the first storage block occurs under execution of the migration processing;
change the first storage block to a special active block status from the active block status, the first storage block of the special active block status holding the valid data and being excluded from selection as the compaction source block; and
change the first storage block to the free block status from the special active block status, when all of the valid data is read from the first storage block of the special active block status, in accordance with rewrite requests.

7. A memory control method for a data storage device that writes and reads data managed in units of blocks to and from a flash memory, the method comprising:
performing, with a controller, migration processing for writing valid data stored in a first storage block to a second storage block, when the first storage block is set as a compaction source block, wherein the first storage block is set as an active block status and the second storage block is set as a free block status, and the valid data being latest data before rewriting;
suspending, by the controller, the migration processing if an error in data read process from the first storage block occurs under execution of the migration processing;
changing, by the controller, the first storage block to a special active block status from the active block status, the first storage block of the special active block status holding the valid data and being excluded from selection as the compaction source block; and
changing the first storage block to the free block status from the special active block status, when all of the valid data is read from the first storage block of the special active block status, in accordance with rewrite requests.

8. The memory control method of claim 7, wherein the first storage block is changed to the special active block status from the active block status if the valid data remains in the first storage block after suspension of the migration processing.

9. The memory control method of claim 7, wherein information indicative of the special active block status is set as management information used to manage a data write status for each storage block, and
the first storage block of the special active block status is excluded from selection for migration processing if the first storage block is selected with reference to the management information.

10. The memory control method of claim 9, wherein the first storage block of the special active block status is maintained until all valid data in the first storage block are rewritten by the data rewrite processing.

* * * * *